United States Patent Office 3,637,676
Patented Jan. 25, 1972

3,637,676
POLYMETHINE DYES CONTAINING A DILACTONE RING, INTERMEDIATES USEFUL IN THEIR SYNTHESIS AND PROCESS FOR PREPARING SAID INTERMEDIATES
Donald W. Heseltine, Rochester, N.Y., assignor to Eastman Kodak Company, Rochester, N.Y.
No Drawing. Original application June 10, 1965, Ser. No. 463,024, now Patent No. 3,440,052. Divided and this application July 30, 1968, Ser. No. 763,456
Int. Cl. C09b 23/00
U.S. Cl. 260—240.1    5 Claims

ABSTRACT OF THE DISCLOSURE

Novel polymethine dyes having at least two heterocyclic nuclei and wherein said polymethine dyes contain at least one dilactone ring, useful as optical sensitizers for photographic silver halide emulsions or as filter dyes, are described. Novel intermediates useful in preparing said polymethine dyes and a novel process for preparing said intermediates are also described.

This application is a division of Heseltine U.S. patent application Ser. No. 463,024, filed June 10, 1965, now U.S. Pat. 3,440,052.

This invention relates to polymethine dyes, and to intermediates useful in synthesizing polymethine dyes.

Various polymethine dyes have been prepared from cyclic $\alpha,\alpha'$-diketomethylene compounds, such as 1,3-indanedione, 1,3-diethylbarbituric acid and 1,3-cyclobutane dione. This invention provides a new class of dyes having at least one methine linkage joining two cyclic nuclei, one of said nuclei featuring a dilactone ring. The invention also provides a highly useful dye intermediate containing a dilactone ring substituent.

One object of this invention is to provide an improved method of making intermediates which are useful in the synthesis of polymethine dyes. Another object of this invention is to provide novel intermediates useful in preparing polymethine dyes. Still another object of this invention is to provide new polymethine dyes. A further object of this invention is to provide a new class of polymethine dyes which are useful as optical sensitizers for photographic silver halide emulsions. Another object of this invention is to provide novel polymethine dyes which are useful as filter dyes, and photographic silver halide emulsion layers containing such novel filter dyes. Other objects of this invention will be apparent from the following disclosure and the appended claims.

In accordance with this invention, dyes and dye intermediates are prepared from a dilactone ring compound having the formula:

(I) 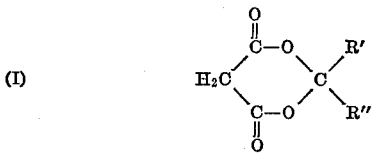

wherein R' and R" each are selected from the group consisting of alkyl substituents of 1 to 12 carbon atoms, such as methyl, ethyl, propyl, isobutyl, amyl, octyl and dodecyl, and cycloalkyl nuclei containing from 4 to 6 carbon atoms, such as cyclobutyl, cyclopentyl and cyclohexyl. The alkyl substituents and the cycloalkyl nuclei may contain various substituents, such as hydroxyl, halogen, acyl such as acetyl, alkoxy such as acetoxy, etc. Particularly good results are obtained with dyes derived from compounds corresponding to Formula I wherein R' and R" each represent a methyl group. Such compounds have been referred to in the literature as Meldrum's lactone, which is 2,2-dimethyl-4,6-diketo-1,3-dioxane. Meldrum's lactone may be prepared by heating malonic acid with acetone in acetic anhydride solution. This compound was originally synthesized by Meldrum in 1908, although the wrong structure was assigned to the compound at that time. The proper structure was reported for Meldrum's lactone by Davidson and Bernhard, J. Am. Chem. Soc. 70 p. 3426, 1948. The latter reference shows preparation of compounds of Formula II wherein R' and R" are various substituents other than methyl.

In one embodiment of this invention, dyes are provided which comprise two heterocyclic nuclei, at least one of said nuclei being a substituent containing a dilactone ring.

Preferably, the dilactone ring containing substituent has one of the following formulas:

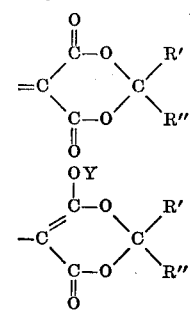

wherein R' and R" have the meaning given above, and Y represents a hydrogen atom, an anion or a negative charge internally satisfied in the dye molecule. Dyes which are particularly useful in accordance with our invention are represented by the following formulas:

(II) 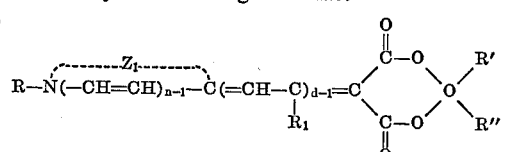

(III) 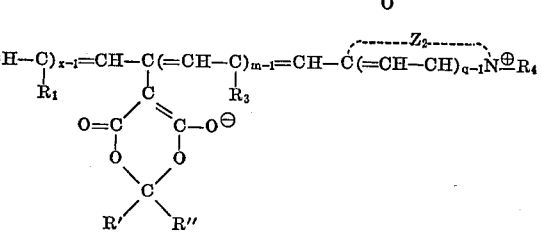

mediates are prepared from a dilactone ring compound having the formula:

(IV) 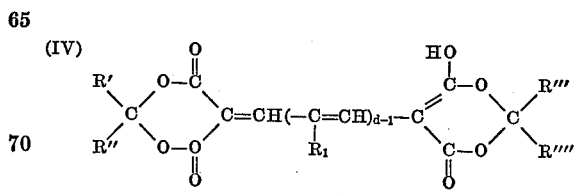

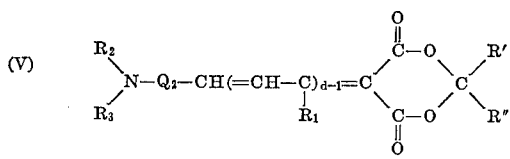

(V)

In the above formula, $R_1$, $R_2$, $R_3$ and $R_4$ each represents a hydrocarbon alkyl substituent of from 1–12 carbon atoms or substituted alkyl e.g., methyl, ethyl, n-propyl, isopropyl, n-butyl, isobutyl, sec. butyl, n-amyl, decyl, dodecyl, $\beta$-hydroxyethyl, $\gamma$-hydroxypropyl, $\beta$-methoxyethyl, $\beta$-ethoxyethyl, allyl, benzyl, $\beta$-phenylethyl, $\beta$-carboxyethyl, carboxymethyl, $\gamma$-carboxypropyl, sulfopropyl, sulfoalkoxyalkyl, $\beta$-acetoxyethyl, $\gamma$-acetoxypropyl, carbomethoxymethyl, $\beta$-carbethoxyethyl, etc., or an aralkyl or aryl substituent such as phenyl, o-, p- or m-tolyl; $R_1$ and $R_5$ each represents a hydrogen atom, methyl, ethyl or the phenyl nucleus; R′ and R″ have the meaning given above; R‴ and R⁗ each represent the same substituents as R′ and R″; $n$ and $q$ each represents a positive integer of 1 or 2; $Q_2$ represents an arylene substituent, such as a phenylene nucleus or a naphthylene nucleus; $d$ represents an integer of from 1 to 4; $x$ and $m$ each represents a positive integer of from 1 to 2; and, $Z_1$ and $Z_2$ each represents the nonmetallic atoms necessary to complete a heterocyclic nucleus containing from 5 to 6 atoms in the heterocyclic ring, such as those selected from the group consisting of those of the thiazole series (e.g., thiazole, 4-methylthiazole, 5-methylthiazole, 4-phenylthiazole, 5-phenylthiazole, 4,5-dimethylthiazole, 4,5-diphenylthiazole, 4-(2-thienyl)thiazole, etc.), those of the benzothiazole series (e.g., benzothiazole, 4-chlorobenzothiazole, 5-chlorobenzothiazole, 6-chlorobenzothiazole, 7 - chlorobenzothiazole, 4 - methylbenzothiazole, 5-methylbenzothiazole, 6-methylbenzothiazole, 5 - bromobenzothiazole, 6 - bromobenzothiazole, 4-phenylbenzothiazole, 5-phenylbenzothiazole, 4-methoxybenzothiazole, 5-methoxybenzothiazole, 6-methoxybenzothiazole, 5 - iodobenzothiazole, 6 - iodobenzothiazole, 4-ethoxybenzothiazole, 5 - ethoxybenzothiazole, tetrahydrobenzothiazole, 5,6 - dimethoxybenzothiazole, 5,6 - dioxymethylenebenzothiazole, 5-hydroxybenzothiazole, 6-hydroxybenzothiazole, etc.), those of the naphthothiazole series (e.g., $\alpha$-naphthothiazole, $\beta$-naphthothiazole, 5-methoxy-$\beta$-naphthothiazole, 5-ethoxy-$\beta$-naphthothiazole, 7-methoxy-$\alpha$-naphthothiazole, 8-methoxy-$\alpha$-naphthothiazole, 7-methoxy-$\alpha$-naphthothiazole, 8 - methoxy-$\alpha$-naphthothiazole, etc.), those of the thianaphtheno-7′,6′,4,5-thiazole series (e.g., 4′ - methoxythianaphtheno-7′,6′,4,5-thiazole, etc.), those of the oxazole series (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e.g., benzoxazole, 5-chlorobenzoxazole, 5 - phenylbenzoxazole, 5 - methylbenzoxazole, 6-methylbenzoxazole, 5,6-dimethylbenzoxazole, 4,6-dimethylbenzoxazole, 5-methoxybenzoxazole, 6-methoxybenzoxazole, 5-ethoxybenzoxazole, 6-chlorobenzoxazole, 5-hydroxybenzoxazole, 6-hydroxybenzoxazole, etc.), those of the naphthoxazole series (e.g., $\alpha$-naphthoxazole, $\beta$-naphthoxazole, etc.), those of the selenazole series (e.g., 4-methylselenazole, 4-phenylselenazole, etc.), those of the benzoselenazole series (e.g., benzoselenazole, 5-chlorobenzoselenazole, 5-methoxybenzoselenazole, 5-hydroxybenzoselenazole, tetrahydrobenzoselenazole, etc.), those of the naphthoselenazole series (e.g., $\alpha$-naphthoselenazole, $\beta$-naphthoselenazole, etc.), those of the thiazoline series (e.g., thiazoline, 4-methylthiazoline, etc.), those of the 2-quinoline series (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e.g., quinoline, 6-methoxyquinoline, 7-methoxyquinoline, 8-methylquinoline, etc.), those of the 1-isoquinoline series (e.g., isoquinoline, 3,4-dihydroisoquinoline, etc.), those of the 3,3-dialkyl- indolenine series (e.g., 3,3-dimethylindolenine, 3,3,5-trimethylindolenine, 3,3,7-trimethylindolenine, etc.), those of the 2-pyridine series (e.g., pyridine, 3-methylpyridine, 4-methylpyridine, 5-methylpyridine, 6-methylpyridine, 3,4-dimethylpyridine, 3,5 - dimethylpyridine, 3,6 - dimethylphenylpypyridine, 4,5 - dimethylpyridine, 4,6 - dimethylpyridine, 4-phenylpyridine, 5-chloropyridine, 6-chloropyridine, 3 - hydroxypyridine, 4 - hydroxypyridine, 5 - hydroxypyridine, 6-hydroxypyridine, 3-phenylpyridine, 4-phenylpyridine, 6-phenylpyridine, etc.), those of the 4-pyridine series (e.g., 2-methylpyridine, 3-methylpyridine, 3-bromopyridine, 3-chloropyridine, 2,3-dimethylpyridine, 2,5 - dimethylpyridine, 2,6 - dimethylpyridine, 2-hydroxypyridine, 3-hydroxypyridine, etc.), etc.

The class of dyes represented by Formula II are highly useful intermediates for synthesizing dyes containing two cyclic nuclei joined through a straight chain linkage containing at least one methine group, at least one of said nuclei containing N, S, Se, Te or O. Compounds of Formula II wherein $d$ represents the integer 1 are especially versatile intermediates for synthesizing polymethine dyes. A feature of such intermediates is that the dilactone ring is very easily hydrolyzed to obtain compounds of Formula VI:

(VI)
$$R-\overset{\oplus}{N}(=CH-CH)_{n-1}=\overset{\overset{\ulcorner------Z_1------\urcorner}{|}}{C}-CH_3$$
$$X^{\ominus}$$

wherein R and $Z_1$ have the meanings given above, and X⁻ represents an anion such as chloride, bromide, iodide, perchlorate, thiocyanate, benzenesulfonate, p-toluenesulfonate, ethylsulfate, etc. Compounds of Formula VI are known to be highly useful dye intermediates. The intermediates of Formula VI are more readily prepared by hydrolysis of compounds of Formula II, where $d$ represents 1, than by prior art methods.

Intermediates of Formula II wherein $d$ represents 1 are readily prepared by quaternizing a compound having the following formula:

(VII)
$$R-\overset{\overset{\ulcorner------Z_1------\urcorner}{|}}{N}(-CH=CH)_{n-1}-C=S$$

Any suitable quaternizing agent may be employed such as p-toluene sulfonic acid-esters. The quaternary salt is then reacted with the dilactone ring compound of Formula I to form the intermedite.

Dyes of Formula II wherein $d$ represents 2 can be prepared conveniently, for example, by condensing an intermediate of Formula VI with a dilactone ring compound of Formula I and, for example, ethyl orthoacetate. These dyes are especially useful in preparing the holopolar dyes of Formula III.

The holopolar dyes of Formula III are excellent spectral sensitizers for photographic silver halide emulsions. This class of dyes may be advantageously prepared, for example by reacting a compound of Formula II wherein $d$ represents 2 with, for example, a compound of the following formula:

$$R-\overset{\oplus}{N}(=CH-CH)_{n-1}=\overset{\overset{\ulcorner------Z_1------\urcorner}{|}}{C}-SCH_2CH_3$$
$$X^{\ominus}$$

wherein R, X and $n$ have the meanings given above.

Dyes of Formula IV are useful filter dyes for photographic elements, and may be prepared, for example, by reacting a compound of Formula I with a suitable alkylene compound such as trimethoxypropene.

The dyes of Formula V are also useful in photographic elements as filter dyes, and are prepared by reacting, for example, a dialkylaminocinnamaldehyde with a dilactone ring compound of Formula I.

The foregoing methods of synthesizing the present dyes are for the most part condensation reactions, and are accelerated by heating the reaction mixture up to reflux temperatures. Preferably, the reaction is carried out in an inert solvent such as ethanol, n-propanol, n-butanol, pyridine, quinoline, isoquinoline, etc. The reactants can be employed with an excess of one or the other, i.e., greater than the stoichiometrically calculated equivalents, but preferably in an approximately equimolar proportion for the best results. Advantageously, the condensations are carried out in the presence of a basic condensing agent such as a trialkylamine, e.g., triethylamine, tri-n-propylamine, tri-n-butylamine, N-methylpiperidine, N-ethylpiperidine, N,N-dimethylaniline, etc.

This invention will be further illustrated by the following examples. Examples 1 and 2 show the preparation of the novel intermediates of the invention.

EXAMPLE 1

5-(3-ethyl-2(3H)-thiazolo[4,5-b]quinolylidene)-2,2-dimethyl-1,3-dioxane-4,6-dione

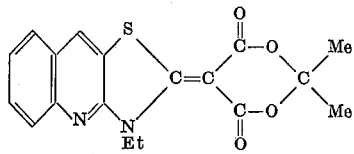

3 - ethyl - 2 - methylthiothiazolo[4,5-b]quinolinium p-toluene-sulfonate (13.0 g., 0.03 mole), 2,2-dimethyl-1,3-dioxane-4,6-dione (13.0 g., 0.09 mole) and ethyl alcohol (30 ml.) were mixed together in a flask. Triethylamine (5 ml.) was added and the whole was heated at refluxing temperature for 5 minutes and chilled. The solid which began to appear during refluxing was collected by filtration and dried. Yield of crude dye was quantitative. The dye was purified by dissolving it in hot pyridine, filtering the solution and recrystallizing the dye by the addition of methanol to the filtrate. The yield of dye after two such purifications was 6.8 g. (64%), M.P. 216–217° d.

EXAMPLE 2

2,2-dimethyl-5-(3-phenyl-2(3H)-thiazolo[4,5-b]quinolylidene-1,3-dioxane-4,6-dione

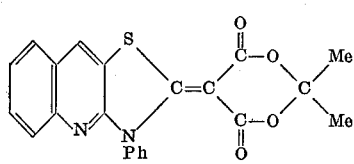

2-methylthio - 3 - phenylthiazolium[4,5-b]quinolinium p-toluenesulfonate (14.7 g., 0.03 mole), 2,2-dimethyl-1,3-dioxane-4,6-dione (13.0 g., 0.09 mole) and ethyl alcohol (30 ml.) were mixed together in a flask. Triethylamine (5 ml.) was added and the whole was heated at refluxing temperature for 5 minutes and chilled. The solid which began to appear during refluxing was collected by filtration and dried. The yield of crude dye was 10.0 g. (83%). The dye was purified by dissolving it in hot pyridine, filtering the solution and recrystallizing the dye by the addition of methanol to the filtrate. The yield of dye after two such purifications was 5.5 g. (49%), M.P. above 300°.

The ease of hydrolysis of the intermediates of the invention, illustrated by those of Examples 1 and 2, to known dye intermediates of Formula VI, is demonstrated in Examples 3 and 4.

EXAMPLE 3

2-methyl-3-phenylthiazolo[4,5-b]quinolinium chloride

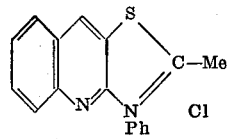

2,2 - dimethyl - 5 - (3-phenyl-2(3H)-thiazolo[4,5-b]quinolylidene-1,3 - dioxane-2,4 - dione (3.68 g., 0.009 mole) hydrochloric acid (200 ml.) (Specific Gravity 1.18) and water (15 ml.) were placed in a flask and refluxed for 3 hours. The solution was concentrated to near dryness, the residue was washed out with acetone and the solid removed by filtration and dried. The yield of crude quaternary salt was quantitative.

EXAMPLE 4

3-ethyl-2-methylthiazolo[4,5-b]quinolinium chloride

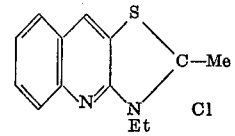

5-(3-ethyl-2(3H) - thiazolo[4,5-b]quinolydiene-2,2-dimethyl-1,3-dioxane - 4,6-dione (3.56 g., 0.01 mole), hydrochloric acid (115 ml.) (Specific Gravity 1.18) and water (15 ml.) were placed in a flask and refluxed for 30 minutes. The solution was then concentrated to near dryness, the residue was washed out with acetone and the solid was removed by filtration and dried. The yield of crude quaternary salt was quantitative.

Preparation of dye intermediates of Formula II wherein $d$ represents at least 2 is illustrated by Examples 5, 6 and 7.

EXAMPLES 5

5-[(3-ethyl-2-benzothiazolinylidene)-1-methylethylidene]-2,2-dimethyl-1,3-dioxane-4,6-dione

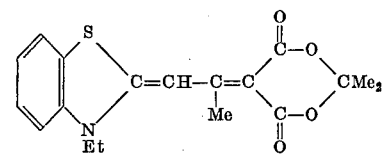

A mixture of 3-ethyl-2-methylbenzothiazolium p-toluenesulfonate (17.5 g., 1 mole), 2,2-dimethyl-1,3-dioxane-4,6-dione (7.2 g., 1 mole) and ethyl orthoacetate (16.2 g., 1 mol. +100%) were heated under reflux in pyridine (50 ml.) for ten minutes. The crude dye was precipitated by the addition of water (200 ml.), the water decanted and the residue boiled with methanol (400 ml.). The dye was collected on a filter and twice recrystallized from pyridine and methanol giving 7.8 g. (46%), M.P. 237–8° dec.

EXAMPLE 6

5-[(1-ethylnaphtho[1,2-d]thiazoline-2-ylidene)-1-methylethylidene]-2,2-dimethyl-1,3-dioxane-4,6-dione

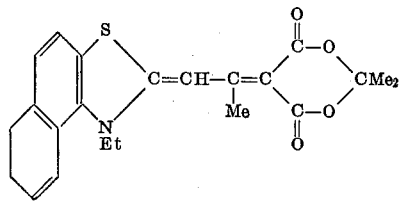

A mixture of 1-ethyl-2-methylnaphtho[1,2-d]thiazolium p-toluenesulfonate (7.98 g., 1 mole), 2,2-dimethyl-1,3-dioxane-4,6-dione (2.88 g., 1 mole) and ethyl orthoacetate (3.24 g., 1 mol. +300% excess) was heated under reflux in pyridine (20 ml.) solution for ten minutes. The dye crystallized after the addition of methanol (200 ml.) and was collected on a filter. After two recrystallizations from pyridine and methanol, the yield of dye was 2.8 g. (36%), M.P. 264–5° dec.

EXAMPLE 7

5-[(1-ethyl-2(1H)-quinolylidene)ethylidene]-2,2-dimethyl-1,3-dioxane-4,6-dione

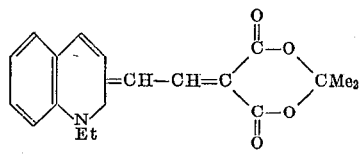

A mixture of 2-β-acetanilidovinyl-1-ethylquinolinium iodide (4.5 g., 1 mole) and 2,2-dimethyl-1,3-dioxane-4,6-dione (1.44 g., 1 mole) and triethylamine (1.4 ml., 1 mole) were heated under reflux in ethanol solution (25 ml.) for ten minutes. The crude dye was precipitated by the addition of water (100 ml.), the water decanted and the sticky residue extracted with boiling benzene (200 ml.). After filtering, the benzene was removed under reduced pressure. The residue became crystalline after stirring with methanol and the dye was collected on a filter. After two recrystallizations from methanol, the yield was 1.1 g., M.P. 251–2° dec.

Examples 8 and 9 show the synthesis of holopolar sensitizing dyes of Formula III.

EXAMPLE 8

5-[bis(3-ethyl-2-benzothiazolinylidene)isopropylidene]-2,2-dimethyl-1,3-dioxane-4,6-dione

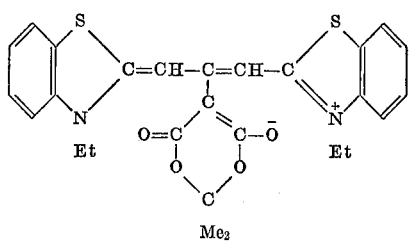

A mixture of 3-ethyl-2-ethylmercapto benzothiazolium ethyl sulfate (3.5 g., 1 mol. +100%) and 5-[(3-ethyl-2-benzothiazolinylidene)isopropylidene] - 2,2 - dimethyl-1,3-dioxane-4,6-dione (1.7 g., 1 mole) and triethylamine (1.4 ml., 1 mol. +100%) in pyridine (20 ml.) were heated under reflux for fifteen minutes. After chilling, the dye was precipitated by the addition of water (100 ml.), the water decanted and the residue boiled with methanol, chilled and solid collected on a filter. After two recrystallizations by dissolving in hot pyridine and filtering into methanol, the yield of dye was 1.5 g. (60%), M.P. 243–4° dec.

EXAMPLE 9

5-[bis(1-ethylnaphtho[1,2-d]thiazolin-2-ylidene)isopropylidene]-2,2-dimethyl-1,3-dioxane-4,6-dione

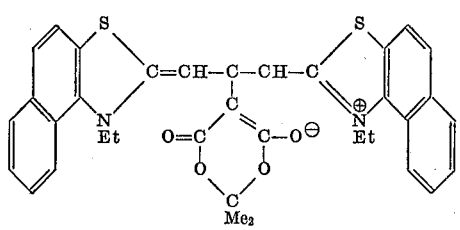

A mixture of 5-[(1-ethylnaphtho[1,2-d]thiazolin-2-ylidene)isopropylidene] - 2,2 - dimethyl - 1,3 - dioxane-4,6-dione (1.96 g., 1 mole), 1-ethyl-2-ethylmercaptonaphtho [1,2-d]thiazolium p-toluenesulfonate (4.45 g., 1 mole +100%) and triethylamine (1.4 ml., 1 mol. +100%) in pyridine (25 ml.) was heated under reflux for fifteen minutes. Methanol (200 ml.) was added with stirring and, after chilling, the crude dye was collected on a filter and washed with methanol. After two recrystallizations by dissolving in hot pyridine and filtering into methanol, the yield of dye was 1.5 g. (50%), M.P. 201–202° dec.

Example 10 illustrates the preparation of an oxonol filter dye of Formula IV.

EXAMPLE 10

Bis-[2,2-dimethyl-1,3-dioxane-4,6-dione(5)]trimethine oxonol

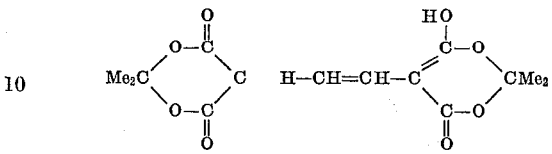

A mixture of 2,2-dimethyl-1,3-dioxane-4,6-dione (2.88 g., 1 mole), trimethoxypropene (2.64 g., 1 mol. +100%) and triethyl amine (2.8 ml., 1 mol. +100%) in pyridine (15 ml.) was heated under reflux for ten minutes. After chilling, the mixture was treated with water (100 ml.) and concentrated hydrochloric acid (10 ml.). The aqueous portion was decanted and the residue stirred with methanol, chilled and the solid collected on a filter. After two recrystallizations by dissolving in methanol and triethylamine and acidifying with concentrated hydrochloric acid, the yield of dye was 1.8 g. (55%), M.P. 187–8° dec. The dye had a deep yellow color, with an absorption maximum at 453 mμ. The dye is bleachable, and was found to be useful in a hydrophilic colloid layer of a photographic element as a filter for blue radiation.

The preparation of filter dyes of Formula V is shown in Example 11.

EXAMPLE 11

5-p-dimethylaminocinnamylidene-2,2-dimethyl-1,3-dioxane-4,6-dione

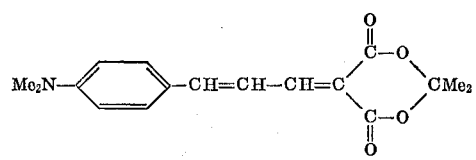

A mixture of p-dimethylaminocinnamaldehyde (1.75 g., 1 mol.) and 2,2-dimethyl - 1,3 - dioxane-4,6-dione (1.44 g., 1 mol.) in ethanol (15 ml.) containing one drop of piperidine was heated under reflux for fifteen minutes. After chilling, the crude dye was collected on a filter, washed with methanol and dried. After two recrystallizations by dissolving in pyridine and filtering into methanol, the yield of dye was 1.5 g. (49%), M.P. 188–9° dec. The dye was red in methanol, and had an absorption maximum at 525 mμ. The dye is bleachable, and was found to be useful in a hydrophilic colloid layer in photographic elements as a filter for green radiation.

The sensitizing effect of the dyes of Examples 8 and 9 was tested by adding the dyes to separate portions of a gelatin silver chlorobromide emulsion containing 60 mole percent iodide. The dyes, dissolved in suitable solvents, were added to the separate portions of the emulsion at a concentration of 0.13 gram per mole of silver. After digestion at 50° C. for 10 minutes, the emulsions were coated at 432 mg. of silver per square foot on a cellulose acetate film support. A sample of each coating was exposed on a sensitometer to a wedge spectrograph, processed for 3 minutes in Kodak Developer D–19, fixed, washed and dried. The dye of Example 8 had a sensitizing range of 520 to 630 mμ, with a sensitizing maximum at 600 mμ.

The dye of Example 9 sensitized in the range of 530 to 680 mμ, with maximum sensitization at 640 mμ.

In the preparation of photographic emulsions, the new dyes of the invention are advantageously incorporated in the washed, finished silver halide emulsion and should, of course, be uniformly distributed throughout the emulson. The methods of incorporating dyes in emulsions are relatively simple and well known to those skilled in the art of emulsion making. For example, it is convenient to add the dyes from solutions in appropriate solvents, in which case the solvent selected should be completely free from any deleterious effect on the ultimate light-sensitive materials. Methanol, isopropanol, pyridine, etc., alone or in admixtures, have proven satisfactory as solvents for the majority of our new dyes. The type of silver halide emulsions that can be sensitized with the new dyes include any of those prepared with hydrophilic colloids that are known to be satisfactory for dispersing silver halides, for example, emulsions comprising natural materials such as gelatin, albumin, agar-agar, gum arabic, alginic acid, etc., and hydrophilic synthetic resins such as polyvinyl alcohol, polyvinyl pyrrolidone, cellulose ethers, partially hydrolyzed cellulose acetate, and the like.

The concentration of the new dyes in the emulsion can vary widely, i.e., from about 5 to about 100 mgs. per liter of flowable emulsion. The specific concentration will vary according to the type of light-sensitive material in the emulsion and according to the effects desired. The suitable and most economical concentration for any given emulsion will be apparent to those skilled in the art upon making the tests and observations customarily used in the art of emulsion making.

To prepare a gelatino-silver halide emulsion sensitized with one of the new dyes, the following procedure is satisfactory: A quantity of the dye is dissolved in a suitable solvent and a volume of this solution containing from 5 to 100 mgs. of dye is slowly added to about 1000 cc. of a gelatino-silver halide emulsion. With most of the dyes, 10 to 20 mgs. of dye per liter of emulsion suffice to produce the maximum sensitizing effect with the ordinary gelatino-silver bromide (including bromoiodide and chlorobromide) emulsions. With fine-grain emulsions, which include most of the ordinary employed gelatino-silver chloride emulsions, somewhat larger concentrations of dye may be necessary to secure optimum sensitizing effect. While the preceding has dealt with emulsions comprising gelatin, it will be understood that these remarks apply generally to any emulsions wherein part or all of the gelatin is substituted by another suitable hydrophilic colloid such as mentioned above.

The above-statements are only illustrative and are not to be understood as limiting the invention in any sense, as it will be apparent that the new dyes can be incorporated by other methods in many of the photographic silver halide emulsions customarily employed in the art. For instance, the dyes can be incorporated by bathing a plate or film upon which an emulsion has been coated, in the solution of the dye in an appropriate solvent. Bathing methods, however, are not to be preferred ordinarily.

Photographic silver halide emulsions, such as those listed above, containing the sensitizing dyes of the invention can also contain such addends as chemical sensitizers, e.g., sulfur sensitizers (e.g., allyl thiocarbamide, thiourea allylisothiocyanate, cystine, etc.), various gold compounds (e.g., potassium chloroaurate, auric trichloride, etc.) (see U.S. patents to W. D. Baldsiefen, 2,540,085, granted Feb. 6, 1951; R. E. Damschroder, 2,597,856, granted May 27, 1952; and H. C. Yutzy et al., 2,597,915, granted May 27, 1952); various palladium compounds, such as palladium chloride (W. D. Baldsiefen, U.S. 2,540,086, granted Feb. 6, 1951); potassium chloropalladate (R. E. Stauffer et al., U.S. 2,598,079, granted May 27, 1952), etc., or mixture of such sensitizers; antifoggants, such as ammonium chloroplatinate (A. P. H. Trivelli et al., U.S. 2,566,245, granted Aug. 28, 1951); ammonium chloroplatinite (A. P. H. Trivelli et al., U.S. 2,566,263, granted Aug. 28, 1951); benzotriazole, nitrobenzimidazole, 5-nitroindazole, benzidine, mercaptans, etc. (see Mees, "The Theory of the Photographic Process," MacMillan Pub., 1942, page 460), or mixtures thereof; hardeners, such as formaldehyde (A. Miller, U.S. 1,763,533, granted June 10, 1930); chrome alum (U.S. 1,763,533); glyoxal (J. Brunken, U.S. 1,870,354, granted Aug. 9, 1932); dibromacrolein (O. Block et al., British 406,750, accepted Mar. 8, 1934), etc.; color couplers, such as those described in I. F. Salminen et al., U.S. Pat. 2,423,730, granted July 7, 1947; Spence and Carroll, U.S. Pat. 2,640,776, issued June 2, 1953, etc.; or mixtures of such addenda. Dispersing agents for color couplers, such as those set forth in U.S. patents to E. E. Jelley et al., 2,322,027, granted June 15, 1943, and L. D. Mannes et al., 2,304,940, granted Dec. 15, 1942, can also be employed in the above-described emulsions.

Although the photographic element example shows coatings made on cellulose acetate supports, it is to be understood that the photographic silver halide emulsions are coated advantageously on any of the support materials used in photographic elements, including glass, paper, polyolefin coated paper, cellulose acetate, cellulose nitrate, and synthetic film-forming resinous materials, such as, the polystyrenes, the polyesters, the polyamides, etc.

The invention has been described in detail with particular reference to preferred embodiments thereof, but it will be understood that variations and modifications can be effected with the spirit and scope of the invention as described hereinabove and as defined in the appended claims.

I claim:

1. A dye having a formula selected from the group consisting of

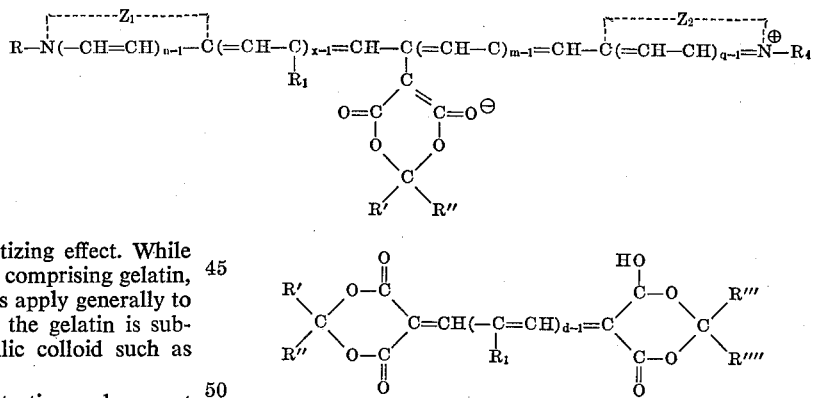

and wherein R′, R″, R‴ and R⁗ each represents a substituent selected from the group consisting of a hydrocarbon alkyl substituent of from 1 to 12 carbon atoms, cyclobutyl, cyclopentyl, and cyclohexyl; R and $R_4$ each represents a substituent selected from the group consisting of a hydrocarbon alkyl substituent of from 1 to 12 carbon atoms; $R_1$ and $R_5$ each represents a substituent selected from the group consisting of hydrogen, a methyl group, an ethyl group and a phenyl nucleus; $d$ represents an integer of from 1 to 4; $x$, $m$, $n$ and $q$ each represents an integer of from 1 to 2; and $Z_1$ and $Z_2$ each represents the nonmetallic atoms necessary to complete a heterocyclic nucleus selected from the group consisting of a thiazole nucleus, a benzothiazole nucleus, a naphthothiazole nucleus, a thianaphtheno-7′,6′,4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, 2(3H)-thiazole[4,5-6]quinoline nucleus, a 2-quinoline nucleus, a 4-quinoline nucleus, a 1-isoquinoline nucleus, a 3,3-dialkylindolenine nucleus, a 2-pyridine nucleus and a 4-pyridine nucleus.

2. A dye in accordance with claim 1 wherein R′ and R″ each represents a methyl group.

3. The dye 5-[bis(1-ethylnaphtho[1,2-d]thiazoline-2-ylidene)isopropylidene]-2,2-dimethyl-1,3-dioxane-4,6-dione.

4. The process of preparing a compound having the formula:

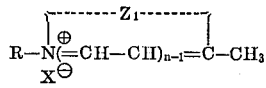

wherein R represents a substituent selected from the group consisting of a hydrocarbon alkyl substituent of from 1 to 12 carbon atoms, pheny, o-tolyl, m-tolyl and p-tolyl; $n$ represents an integer of from 1 to 2; $Z_1$ represents the non-metallic atoms necessary to complete a heterocyclic nucleus selected from the group consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2(3H)-thiazole[4,5-b]quinoline nucleus, a 2-quinoline nucleus, a 4-quinoline nucleus, a 1-isoquinoline nucleus, a 3,3-dialkylindolenine nucleus, a 2-pyridine nucleus and a 4-pyridine nucleus; and $X^\ominus$ represents an acid anion, which comprises refluxing a compound having the following formula:

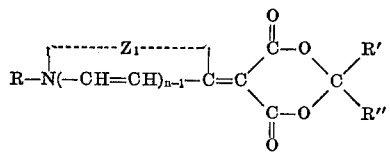

wherein R' and R'' each represents a substituent selected from the group consisting of a hydrocarbon alkyl substituent of from 1 to 12 carbon atoms, cyclobutyl, cyclopentyl and cyclohexyl; R, $Z_1$ and $n$ have the meanings given above, wtih a mineral acid in aqueous solution.

5. The process in accordance with claim 4 wherein said mineral acid is hydrochloric acid.

References Cited
UNITED STATES PATENTS

| | | | |
|---|---|---|---|
| 1,946,202 | 2/1934 | Gabriel et al. | 260—340.2 |
| 2,956,878 | 10/1960 | Michiels et al. | 260—304 X |

FOREIGN PATENTS

| | | | |
|---|---|---|---|
| 1,137,056 | 1/1957 | France | 260—240 |

OTHER REFERENCES

Chemical Abstracts, vol. 21, pages 3358 to 3359 (1927) (abstract of Tilicheev).

Carothers et al.: Ber. Deut. Chem., vol. 64, pages 1755 to 1759 (1931).

Worrall et al.: J. Am. Chem. Soc., vol. 62, pages 424 to 425 (1940).

Barnikow et al.: J. fur Prakt. Chem., vol. 30, 4th series, pages 13 to 17 (1965).

JOHN D. RANDOLPH, Primary Examiner

U.S. Cl. X.R.

96—84, 106; 260—240 E, 240 D, 240.2, 240.4, 288, 340.2

UNITED STATES PATENT OFFICE
CERTIFICATE OF CORRECTION

Patent No. 3,637,676          Dated January 25, 1972

Inventor(s) Donald W. Heseltine

It is certified that error appears in the above-identified patent and that said Letters Patent are hereby corrected as shown below:

Column 10, claim 1, first formula, that portion of formula reading 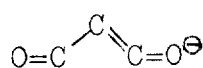 should read 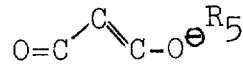

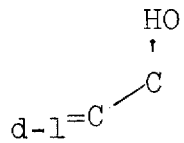          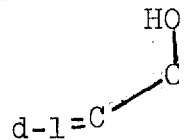

Column 10, claim 1, second formula, that portion of formula reading          should read Column 10, claim 1, first line following second formula, delete "and" before "wherein".

Column 10, claim 1, line 70, "azoline nucleus, 2(3H)-thiazole/4,5-6/quinoline nucleus," should read ---azoline nucleus, a 2(3H)-thiazolo/4,5-b/quinoline nucleus.---

Column 11, claim 3, line 1, "thiazoline" should read ---thiazolin---.

Column 11, claim 4, line 20, "thiazole" should read ---thiazolo---.

Signed and sealed this 22nd day of August 1972.

(SEAL)
Attest:

EDWARD M. FLETCHER, JR.          ROBERT GOTTSCHALK
Attesting Officer          Commissioner of Patents